United States Patent [19]

McDermott et al.

[11] Patent Number: 5,210,380
[45] Date of Patent: May 11, 1993

[54] DIGITIZER WITH SERPENTINE-TYPE CONDUCTOR GRID HAVING UNIFORM CONDUCTOR REPEAT INCREMENTS

[75] Inventors: Robert M. McDermott, Weston; Paul D. Smith, New Canann; Scott McDermott, Weston, all of Conn.

[73] Assignee: Summagraphics Corporation, Seymour, Conn.

[21] Appl. No.: 741,032

[22] Filed: Aug. 6, 1991

Related U.S. Application Data

[63] Continuation-in-part of Ser. No. 505,944, Apr. 6, 1990, Pat. No. 5,051,545.

[51] Int. Cl.$^5$ .............................................. G08C 21/00
[52] U.S. Cl. ...................................................... 178/19
[58] Field of Search ..................... 178/18, 19; 364/520

[56] References Cited

U.S. PATENT DOCUMENTS

| | | | |
|---|---|---|---|
| 3,399,401 | 8/1968 | Ellis et al. | 340/324 |
| 3,466,646 | 9/1969 | Lewin | 340/347 |
| 3,573,755 | 4/1971 | Ellis et al. | 340/173 |
| 3,647,963 | 3/1972 | Bailey | 178/19 |
| 3,705,956 | 12/1972 | Dertuzos | 178/18 |
| 3,819,857 | 6/1974 | Inokuchi | 178/19 |
| 3,873,770 | 3/1975 | Ioannou | 178/18 |
| 3,904,822 | 9/1975 | Kamm et al. | 178/18 |
| 4,014,015 | 3/1977 | Gunlach | 340/347 P |
| 4,029,899 | 6/1977 | Gordon | 178/19 |
| 4,079,627 | 3/1978 | Gundlach | 73/313 |
| 4,110,556 | 8/1978 | Hawkes | 178/19 |
| 4,368,352 | 1/1983 | Davis et al. | 178/19 |
| 4,378,465 | 3/1983 | Green et al. | 178/19 |
| 4,418,242 | 11/1983 | Kouno | 178/19 |
| 4,471,162 | 9/1984 | Aono et al. | 178/19 |
| 4,552,991 | 11/1985 | Hulls | 178/19 |
| 4,570,033 | 2/1986 | Hulls | 178/19 |
| 4,705,919 | 11/1987 | Dhawan | 178/19 |
| 4,729,108 | 3/1988 | Uchiyama | 364/520 |
| 4,734,546 | 3/1988 | Landmeier | 178/19 |
| 4,794,209 | 12/1988 | Asada et al. | 178/19 |
| 4,831,216 | 5/1989 | Landmeier | 178/19 |
| 4,835,347 | 5/1989 | Watson | 178/19 |
| 4,948,926 | 8/1990 | Murakami et al. | 178/19 |
| 5,051,545 | 9/1991 | McDermott | 178/19 |

*Primary Examiner*—Stafford Schreyer
*Attorney, Agent, or Firm*—Rosen, Dainow & Jacobs

[57] ABSTRACT

Disclosed herein are position determining apparatus and conductor structures or grids therefor. The conductor structure for each axis includes a number of conductors which are run in a serpentine-type path each with uniform repeat increment. The repeat increment, which is the spacing or span between one run and the next of the same serpentine-type conductor, are uniform for each conductor (but may change from conductor to conductor) and is constrained by a maximum repeat increment, or a minimum repeat increment. In the preferred embodiments, there is at least a constraint on the maximum repeat increment to provide noise immunity. The conductors are arranged for each axis of the grid in a pattern such that signals obtained for that axis may be processed to provide binary numbers in a Gray-type code each unique to a small region of the active area in which the coil center is located. The small region for a given axis corresponds to the space between two immediately adjacent, active conductor portions for that axis, with a possible ambiguity of one space. Small regions in each axis define the coarse location of the coil center. Fine location within a region may be determined from the magnitudes of currents induced in selected runs preferably by interpolation.

39 Claims, 8 Drawing Sheets

DIGITIZER WITH SERPENTINE-TYPE CONDUCTOR GRID HAVING UNIFORM CONDUCTOR REPEAT INCREMENTS

RELATED APPLICATION

This application is a continuation-in-part of (allowed) application Ser. No. 07/505,944, filed Apr. 6, 1990, now U.S. Pat. No. 5,051,545, issued Sep. 24, 1991, which is assigned to the assignee of this application.

BACKGROUND OF THE INVENTION

The invention disclosed herein relates to position determining devices, systems and methods, particularly to digitizer systems of the type including a tablet having a conductor structure which interacts with a movable element or pointer such as a stylus or cursor and the like to provide signals, particularly for a computer, representing the position of the movable element relative to the tablet.

Application Ser. No. 07/505,944, the disclosure of which is hereby incorporated herein by reference, addressed the need for digitizer systems and digitizer conductor structures which employ a reduced number of connections between the conductor structure and the signal processing circuitry, which utilize conductor patterns that may be determined relatively easily, which locate a movable element with respect to two conductors with simplified processing, and which perform, for example, with acceptable resolution and accuracy.

This application addresses the same needs and discloses a digitizer system and conductor structure which are improvements in certain respects over those disclosed in Ser. No. 07/505,944.

According to Ser. No. 07/505,944, a conductor structure or system (sometimes referred to as a "grid") includes, for each axis, a number of conductors, at least one of which is run in a serpentine path with a non-uniform repeat increment. A conductor run in such a serpentine path includes for a given axis spaced active portions or runs which are substantially parallel to each other running substantially parallel to the axis, and connecting portions interconnecting or "spanning" the active portions. The active portions of the respective conductors may be connected in series, in parallel or in other ways. The repeat increment or "span" is simply the spacing between one run and the next of the same serpentine conductor, and may (but need not, depending on factors such as noise immunity and fine position determination accuracy) be constrained by a maximum repeat increment, and/or a minimum repeat increment, and/or a maximum change in repeat increments between consecutive runs of a same conductor. Ser. No. 07/505,944 describes grids laid out to provide codes which change in only one bit from state-to state, with no significance to each bit and no least or most significant bit. An algorithm for generating such a code, subject to certain constraints, is disclosed in Ser. No. 07/505,944. Ser. No. 07/505,944 also discusses potential inaccuracies which could occur when the repeat increments on each side of the conductor runs being used for fine interpolation are unequal.

Arranging conductors in a pattern so that spaces or regions between conductor runs (or the runs themselves) may be uniquely identified by unique binary numbers, e.g., in a Gray-type code, are not new developments. See, for example, U.S. Pat. Nos. 3,466,646 of Lewin, issued Sep. 9, 1969; 3,647,963 of Bailey, issued Mar. 7, 1972, assigned to the assignee of this application; 3,705,956 of Dertouzos, issued Dec. 12, 1972; 3,819,857 of Inokuchi, issued Jun. 25, 1974; 4,029,899 of Gordon issued Jun. 14, 1977; 4,378,465 of Green et al., issued Mar. 29, 1983; 4,552,991 of Hulls, issued Nov. 12, 1985; 4,734,546 of Landmerer, issued Mar. 29, 1988; 4,831,216 of Landmerer, issued May 16, 1989; and 4,835,347 of Watson, issued May 30, 1989.

One approach in digitizer systems employing serpentine-type grid conductors was to successively divide the active area into smaller and smaller regions. Thus, for example, one conductor divided the tablet in a given axis in half, another conductor in quarters, another in eighths, etc. With three conductors, a tablet may be divided according to this approach into eighths, with four conductors into sixteenths, with five conductors, into thirty-seconds. See, for example, the Inokuchi '857 Patent.

Grid conductors laid out in the classic Gray Code sequence disclosed in the Dertouzos '956 and Inokuchi '857 Patents introduce several sources of inaccuracy and are severely limited in feasible grid sizes, because the classic Gray code sequence has a least significant bit (LSB) which changes often (i.e., has many repeating runs), and a most significant bit (MSB) which changes rarely (i.e. has few repeating runs, typically just one which bisects the entire grid or tablet area). Thus, the MSB conductor divides the active area in half, which for a 12 inch tablet separates the adjacent active portions or runs of that conductor by six inches, and for a 24 inch tablet, separates the active portions of the conductor dividing the tablet in half by 12 inches. To operate with large spaces between conductor active portions of the MSB conductor while providing unambiguous signals induced in either the grid conductors or the movable element conductor, requires one or more of the following: high signal levels; a large conductor in the movable element; or sensitive processing circuitry. To avoid such requirements and to allow the bit place represented by a given conductor, e.g., the MSB conductor, to be read unambiguously for accurate coarse position determination, the total distance between active portions of a conductor is not made greater than a given distance, e.g., twice the "range" of the pickup device, as determined by signal strength and noise.

Since in such classic Gray code sequence grids the length of the LSB conductor is significantly longer than the MSB conductor, and since the linear relative lengths of other conductors are also different, some form of compensation, e.g., in processing, and/or different drives and/or different amplifications is required for each conductor to maintain signal levels in a proper relationship. Another possible source of error in such classic Gray code sequence grids stems from the differences in responses from conductors with different repeat increments. For example, the response to/from the LSB conductor will be affected by the close repeated runs, while the MSB conductor, not being repeated, will not be so affected, and the conductors between these extremes will be affected to different degrees as the number of runs of a conductor goes from 2, 4, 8, 16, etc. Thus, an interpolation of signal values in the region between the conductor runs having large differences in repeat increments, e.g., the MSB and LSB conductors, will be inaccurate due to these different characteristics.

Another approach was to divide the tablet area into halves, quarters, etc., as above described, but using a plurality of runs of the same conductor in each subdivided portion of the tablet, rather than only one conductor run per tablet half, tablet quarter, etc. See the Lewin '646 Patent cited above. Since in this approach the individual runs of the same conductor are not widely separated, the digitizer system does not require the higher signal levels, larger movable element conductor or sensitive processing circuitry of the approach discussed above. However, with a given spacing between adjacent conductor runs of all conductors (said given spacing being referred to herein as "basic spacing"), using a number of runs of the same conductor in the same sub-divided tablet portion simply reduces the total number of unique spaces that can be identified with a given number of conductors.

OBJECTS AND SUMMARY OF THE INVENTION

It is an object of the invention disclosed in this application to simplify and/or reduce the cost of position determining apparatus, particularly large area apparatus.

It is another object of the invention to improve and/or simplify conductor structures and/or signal processing circuitry for use in position determining apparatus.

It is another object of the invention to provide improved conductor structures which require a reduced number of switches or multiplexer inputs between the respective conductor structure and signal processing or conductor energizing circuitry, for use in position determining apparatus.

It is another object of the invention to provide conductor structures and signal processing circuitry for large area position determining apparatus, e.g., apparatus having an active position determining area in one axis of up to 48 inches or more.

It is another object of the invention to simplify methods for processing signals associated with such conductor structures to obtain signals representing the position of the movable element relative to the conductor structure.

It is another object of the invention to provide apparatus and methods which simplify determination of the position of a movable element relative to a conductor structure of the apparatus.

It is another object of the invention to provide a method for determining conductor patterns for such conductor structures.

The invention disclosed herein is based on the recognition that a serpentine-type conductor structure of the type disclosed in Ser. No. 07/505,944, but one in which all or some of the conductors have equal spacing between runs or active portions of the same conductor, i.e., have equal or uniform repeat increments rather than non-uniform repeat increments or spacing as disclosed in Ser. No. 07/505,944, may be laid out such that unique binary numbers may be obtained representing a specific conductor or small region in the conductor structure, and such that fine position determination by interpolation is facilitated because signal contributions from conductor runs on each side of a given conductor run whose signal contribution is used in the interpolation cancel, or tend to cancel. The repeat increment or "span" for a serpentine-type conductor is simply the spacing between one run and the next of the same serpentine-type conductor. The serpentine-type conductors may have spaced active portions connected in series, parallel or in other ways. With respect to fine position determination using interpolation, a "balancing" is provided on each side of the given conductor run such that the primary current contributions used in the interpolation are those from a limited number of desired conductors which enable a more accurate interpolation using linear interpolation techniques. In accordance with the invention, the repeat increments or spans of the conductors need not vary as disclosed in Ser. No. 07/505,944, but may be uniform for each conductor, although the repeat increment from conductor to conductor may vary.

Thus, according to the invention, conductors may be arranged to define a grid such that signals obtained from the conductors or from a conductor in the movable element (e.g., a coil at the frequencies of interest) may be processed to provide such binary numbers each unique to a specific conductor or small region of the active area in or adjacent which a reference point of the movable element (e.g., the center of the coil) is located, but in accordance with the invention, the repeat increment connecting active portions of a conductor may be the same.

A conductor structure or system embodying the invention includes, for each axis, at least three conductors, each of which includes at least three spaced active portions or runs which for a given axis are substantially parallel to each other running substantially parallel to the axis, and connecting portions interconnecting the active portions in series, parallel or in other ways. The repeat increments interconnecting the active portions may be uniform for a given conductor, with the conductors being arranged in a pattern such that signals obtained for that axis from the grid conductors or from a conductor in the movable element may be processed to provide unique binary numbers. While the repeat increments for a given conductor are uniform, the repeat increments may differ for different ones of the three conductors. The repeat increments, according to the invention disclosed herein, may be constrained by a maximum repeat increment and/or a minimum repeat increment, and preferably both.

The conductor structure or system, and apparatus incorporating the conductor structure or system, may otherwise be generally as described in Ser. No. 07/505,944, except as described to the contrary herein or so modified herein.

With respect to the minimum repeat increment, the primary constraint thereon is that adjacent runs of the same conductor should be spaced so that the induced signal phase changes in a particular conductor (or movable element) as the movable element is moved past only one of the two adjacent runs of that same conductor, and where the basic spacing between conductor active portions is uniform, must be spaced by at least twice the basic spacing of all conductor active portions. Another minimum repeat increment criterion relates to fine position determination, and is based on the effect on interpolation from signals induced in or by runs of the same conductor other than the run closest to the movable element reference point. For, example, where mathematical interpolation is used, as described below, the repeat increment should be large enough to provide good linearity of signal level vs. distance between the signal induced in (or by) the two conductor runs used for interpolation. Maintaining such linearity enables the fine position to be determined directly from a mathematical operation performed directly on current magnitudes, as opposed to first performing a mathematical operation on signal values (e.g., forming a ratio) and then using the result of the mathematical operation with a look-up table to obtain the interpolated fine position.

Conflicting goals are presented between maximum and minimum repeat increments, i.e., to minimize errors, the minimum repeat increment is set as large as possible and, for noise immunity, the maximum repeat increment is set as small as possible.

As indicated above, fine position may be determined by interpolation as disclosed herein and as disclosed in Ser. No. 07/505,944, and in other ways.

The method disclosed in Ser. No. 07/505,944 for determining a layout of a conductor structure of n conductors having the characteristics described therein may be used to determine the conductor structure disclosed herein, except that conductors placed into the conductor structure have a uniform repeat increment or equal spans between active conductor portions, i.e., equal first spaces. However, other algorithms are preferred which are described below. Such algorithms find an infinite length span or repeat increment sequence (with each wire having uniform spans) for n wires in which the spans have a minimum and maximum span length, where n is an integer greater than or equal to three. A sequence of n wires with fixed spans is defined as having infinite length if no two wires are defined to be located at the same location. Then the number of unique regions defined for the infinite length sequence is determined and remembered if it is greater than any previous infinite length span sequence found. This continues until no sequence is found which has more unique regions than previous remembered sequences. The largest remembered sequence is reported as the maximal length span sequence.

A method according to the invention for determining the location of a movable element relative to a conductor structure which interacts with the movable element when the movable element is adjacent the conductor structure upon energization of at least one of the conductor structure and the movable element, is essentially the same as disclosed in Ser. No. 07/505,944 and comprises: providing a conductor structure of n conductors having the characteristics described above; energizing one of the conductor structure and the movable element; and processing signals obtained from the other of the conductor structure and movable element to provide a unique binary number which uniquely identifies a space or at least one conductor active portion close to the movable element. A fine location may then be determined using, for example, magnitude interpolation or the phase relationship of signals on the conductors.

BRIEF DESCRIPTION OF THE DRAWINGS

The invention is illustrated by way of example and not limitation in the FIGURES of the accompanying drawings in which like references denote the same or corresponding parts, and in which.

DESCRIPTION OF THE PREFERRED EMBODIMENTS

Figure 1:
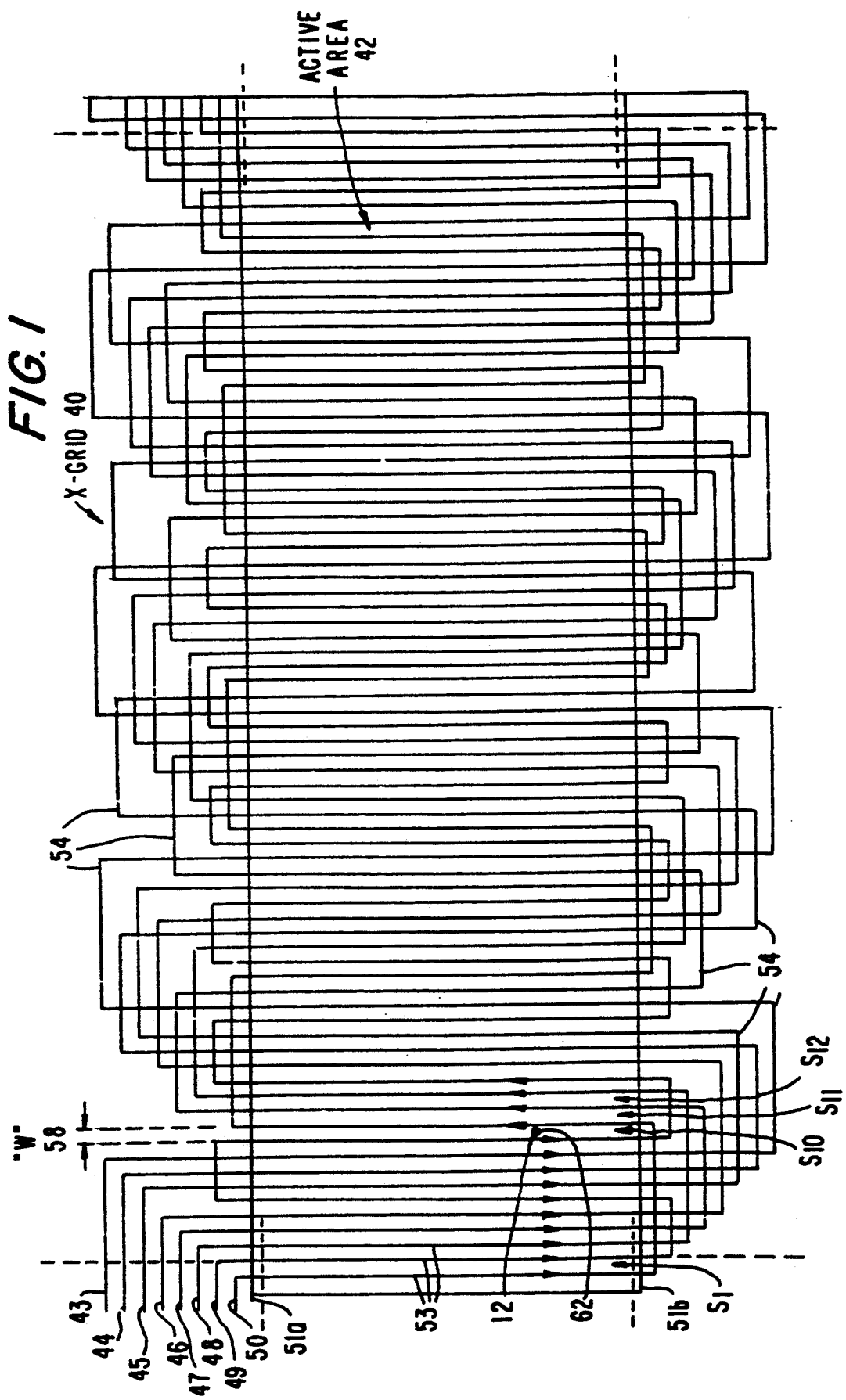
FIG. 1 is a schematic view of one axis of an eight conductor per axis grid structure according to the invention.

The digitizer system and the conductor structures and systems illustrated in the drawings and described below are of the electromagnetic type. However, the invention is not limited to such digitizers systems and such conductor structures and systems. In an electromagnetic system, the conductors of the conductor structure or grid are electrical conductors, the conductor in the movable element is an inductor or coil, and the movable element reference point is the center of the coil.

Ser. No. 07/505,944 describes operation of a prior art serpentine grid conductor structure laid out in a Gray-code type configuration, and serpentine grid structures having non-uniform repeat increments selected and laid out so that a binary number is obtained which uniquely identifies two conductor active portions between which, or on one of which, the coil in the movable element is located. In Ser. No. 07/505,944, the serpentine conductors are shown to have active portions connected in series, although they may be connected in parallel and in other ways.

In accordance with the invention, n serpentine-type conductors are laid out with the repeat increment of at least three of the conductors being uniform but different as between the three conductors, at least in the position-determining portion of the grid to provide up to $2^n-1$ uniquely identifiable spaces in a serpentine-type grid system, n being an integer greater than or equal to 3.

Figure 3A:
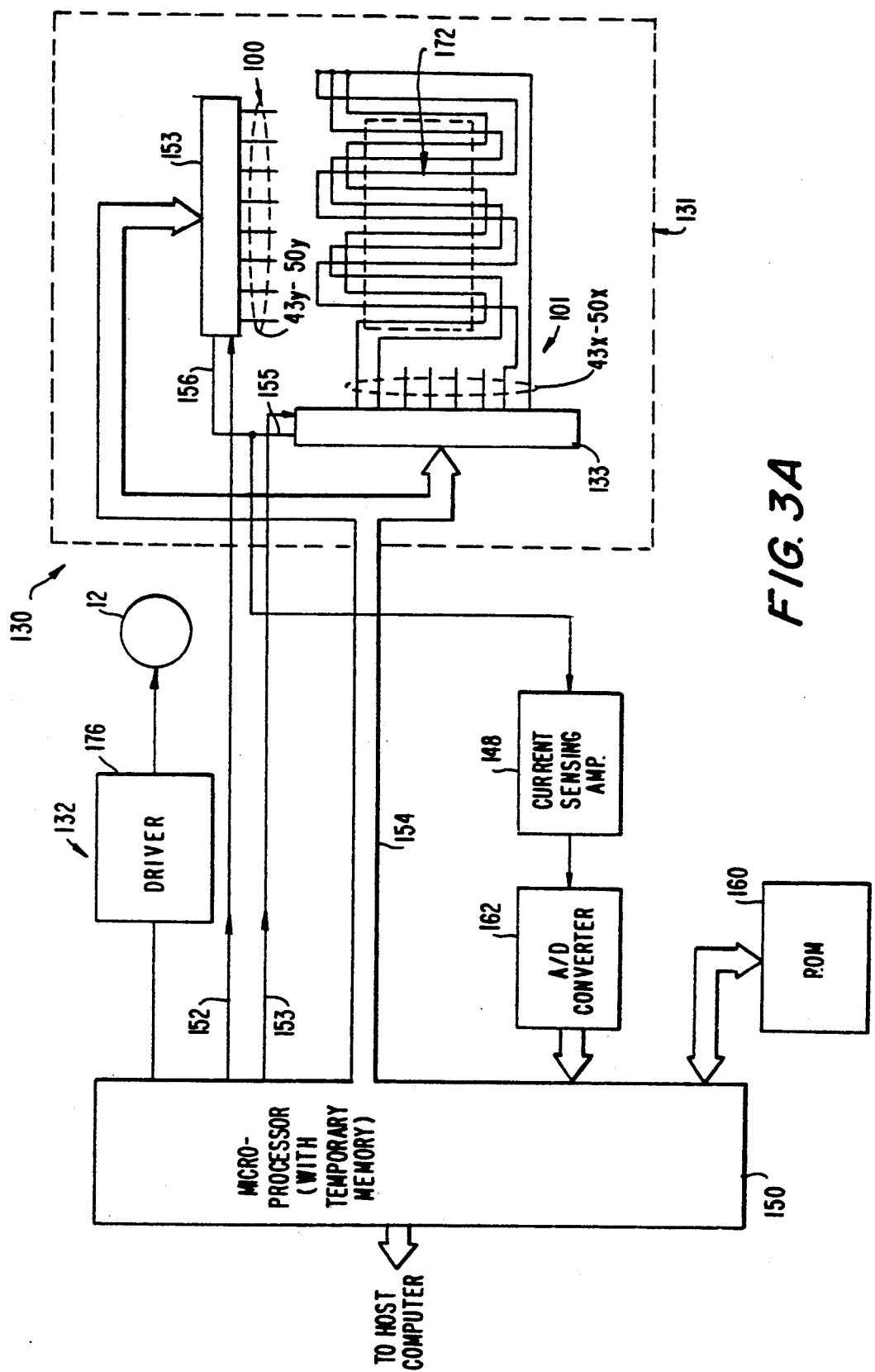
FIG. 3A is a functional block diagram of signal processing circuitry for a transducer driven digitizer system which incorporates for both axes the grid structure depicted in FIG. 1.
Figure 3B:
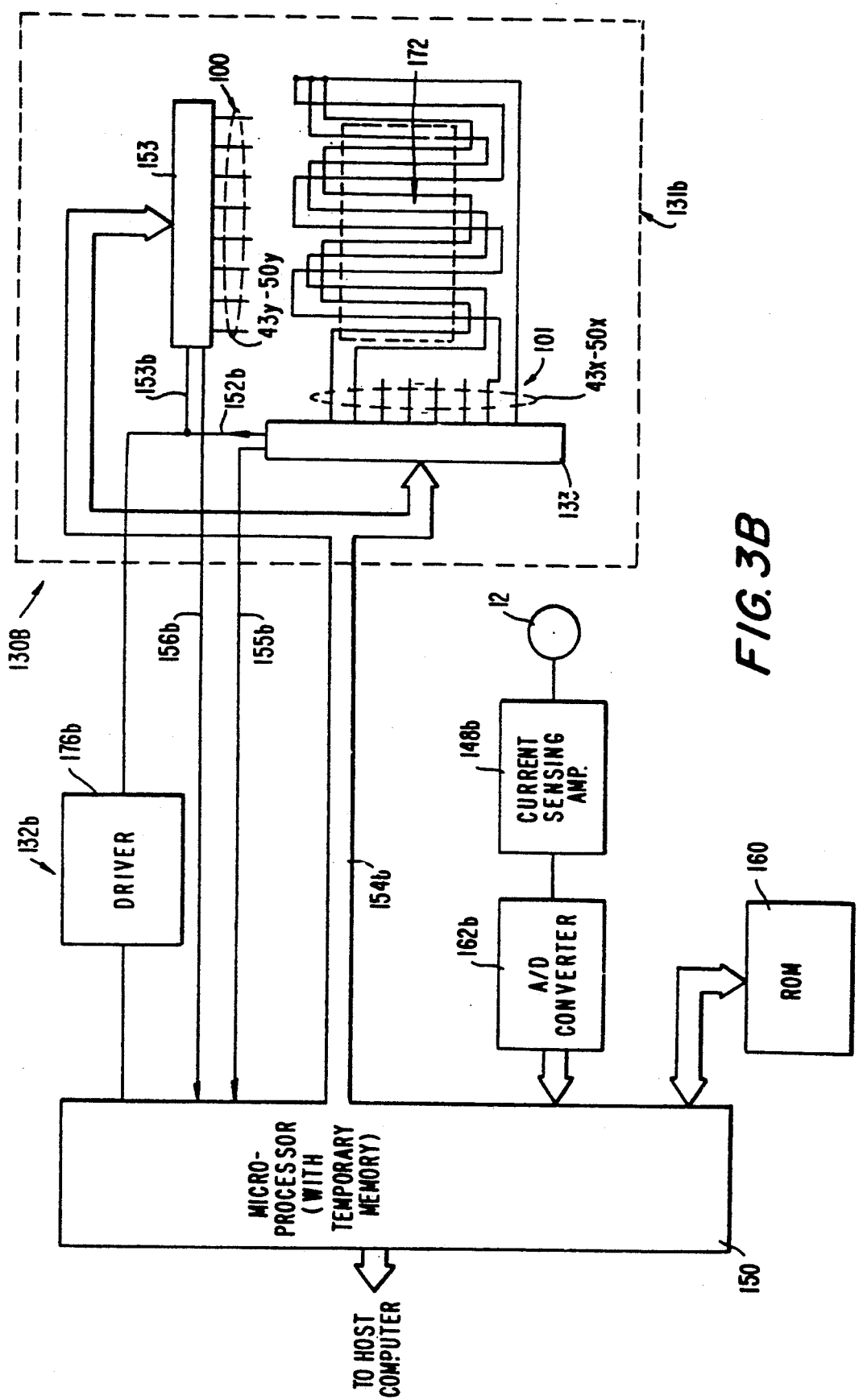
FIG. 3B is a functional block diagram of signal processing circuitry for a grid driven digitizer system which incorporates for both axes the grid structure depicted in FIG. 1.

FIG. 1 shows a conductor structure or grid 40 for one axis, e.g., the X-axis, of a grid system incorporating the invention for an approximately 20 inch active area 42 in the one axis. Hereinafter, the "one" axis will be referred to as the "X" axis for simplicity. X-axis grid 40 comprises eight conductors 43–50. Conductors 51a and 51b are common returns for the X-axis grid conductors terminating at the top and bottom, respectively of X-axis grid 40. Conductors 43–50 are coupled to respective inputs of a multiplexer (not shown), generally as shown in FIG. 3A or 3B and discussed below. Since the X-axis grid 40 and a Y-axis grid (not shown) of which the grid system is comprised may be the same, the following description of the X-axis grid 40 applies also to the Y-axis grid.

Each of the X-axis conductors 43–50 includes a plurality of spaced, parallel active portions or runs 53 extending in the Y direction. The active portions of the Y-axis grid conductors extend in the X direction normal to the X-axis active portions, and the X-axis and Y-axis grid conductors are insulated from each other. Adjacent active portions 53 of each conductor are connected in series by connecting portions 54 which extend in the X direction outside of active area 42. The active portions 53 of all conductors 43–50 are spaced by spaces 58 (second spaces). Each of conductors 43–50 extend in different closely-spaced planes so that they may be insulated in known manner from each other by a non-conductive layer. Alternatively, the different conductors of a same axis may be insulated from each other at the crossover or intersecting points. Coil-grid interaction and the generation of unique binary numbers to uniquely identify each conductor active portion 53, or the spaces 58 therebetween, is described below.

It is preferred that the conductor runs of all conductors be uniformly spaced, i.e., that there be a uniform basic conductor spacing 58 ("W") between adjacent runs of all conductors. However, they need not be. Uniform spacing is preferred because it facilitates fine location determination using interpolation techniques. Thus, with reference to FIG. 1, the basic spacing 58 between runs of all conductors 43–50 is uniform. Each individual conductor 43–50 is run in a serpentine path from one side of X-axis grid 40 to the other. (However, it is not necessary that all conductors in a particular grid be run in a serpentine fashion, and a grid may include non-serpentinely run conductors.) Each conductor 43–50 includes from 7 to 17 active portions 53, and the X-axis grid 40 laid out as shown in FIG. 1 has a total of 80 active portions, all but a few of which lie in active area 42 (about four active area portions lie in the margins). Thus, active area 42 for the X-axis includes 76 spaces 58.

Each of conductors 43–50 has a uniform repeat increment, i.e., the first spaces between adjacent runs of the same conductor are equal. However in order to span more than 2n (2×8=16) spaces, and still uniquely identify in a Gray-type code each of the spaces 58 of the X-axis grid 40 in active area 42 with a constraint on the maximum repeat increment for each conductor in accordance with the invention, at least two of conductors 43–50 have repeat increments or first spaces between its respective active portions 53 which are different. In the particular embodiment depicted in FIG. 1, three of conductors 43–50 have different repeat increments as set forth in Table I below. The repeat increments of conductors 43–50 may be determined manually or with computer assistance using, for example, the algorithm flow charted in FIG. 7. Patterns of eight serpentine conductors other than the one depicted in FIG. 1, without a constraint on the maximum repeat increment of the conductors, will provide up to 255 uniquely identifiable regions or spaces 58 (or 256 conductor runs) in a Gray-type code. With a constraint on the maximum repeat increment, the maximum number of uniquely identifiable regions or spaces 58 will be less than 255.

A constraint on the minimum conductor repeat increment is also preferably imposed in accordance with the invention, as discussed herein.

As set forth in Table I below, the maximum repeat increment is 10 and the minimum repeat increment is 4. The actual spacing between adjacent active portions 53 of the same conductor is a multiple of the basic spacing 58 between adjacent active portions 53 of all conductors. Thus, for a basic spacing 58 of 0.25 inch, a repeat increment of 4 equals one inch.

TABLE I

| Conductor | Repeat Increment |
|---|---|
| 43 | 10 |

TABLE I-continued

| Conductor | Repeat Increment |
|---|---|
| 44 | 4 |
| 45 | 10 |
| 46 | 8 |
| 47 | 10 |
| 48 | 10 |
| 49 | 8 |
| 50 | 10 |

Constraints on the maximum and minimum repeat increments for serpentine-type grid conductor structures according to the invention are determined in consideration of the following.

The constraint on the maximum and minimum repeat increments are the same as described in Ser. No. 07/505,944, except with respect to the following for minimum repeat increment.

Figure 2:
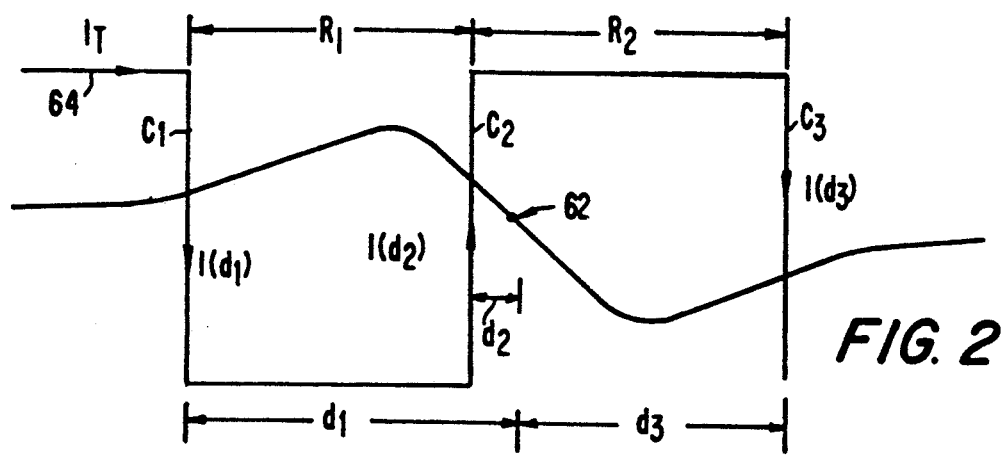
FIG. 2 is a schematic diagram showing current induced in a serpentine-type grid conductor as a function of the distance of the conductor runs of the same conductor from the center of a coil which interacts with the conductor.

Referring to FIG. 2, in most areas of a serpentine grid tablet, the total amplitude of the induced current $I_T$ is the individual contributions of multiple conductor runs, e.g., the contributions of $I(d_1)$, $I(d_2)$ and $I(d_3)$ in conductor runs C1, C2 and C3. The current introduced by the $I(d_2)$ contribution is of the opposite polarity to the current introduced by the $I(d_3)$ contribution. If conductor runs C1 and C3 are equidistant from coil center 62, i.e., $d1=d2$, then the currents in conductor runs C1 and C3 are equal and opposite, and cancel. In such a case, the total current in conductor 64 will be $I(d_2)$, which introduces no interpolation error. Ser. No. 07/505,944 suggests that interpolation may be facilitated and interpolation accuracy may be improved by spacing the conductor runs immediately adjacent each side of the run closest to the coil center equidistantly therefrom. For example, conductor run C1 and conductor run C3 would be spaced equally from conductor run C2, i.e. $R_1=R_2$. However, Ser. No. 07/505,944 discloses that all conductor runs of the same conductor are not equidistantly spaced, i.e., the repeat increments vary. Ser. No. 07/505,944 also indicates that regardless of conductor spacing, since the conductors are fixed and the coil is movable, the conductor runs immediately adjacent the one closest to the coil center will seldom be equidistant from the coil center.

Ser. No. 07/505,944 teaches minimizing unequal spacing or imbalance of the two conductor runs on each side of the run closest to the coil center by imposing a constraint on the maximum change in repeat increment from run to run of the conductors, and gives the example of a maximum change in repeat increment of 2. However, as discussed above, the applicant has now determined that limiting the maximum change in the repeat increment to zero, i.e., a uniform repeat increment, is possible for a conductor structure which nevertheless enables unique binary numbers to be generated as described above, and which solves the imbalance problem described above, albeit with a reduction in the overall number of possible uniquely identifiable spaces or regions.

Selection of the basic conductor spacing "W", which impacts on resolution for coarse location determination and accuracy for fine location determination, is described in Ser. No. 07/505,944.

Referring again to FIG. 1, processing circuitry (not shown in FIG. 1, see FIGS. 3A and 3B) provides a unique binary number identifying the position of the Center 62 of coil 12 for each space 58, which identifies the two active conductor portions 53 defining the particular space 58 between which the coil center 62 lies. For example, the binary number "11111111" (conductor order is 43, 44 . . . 50) identifies (locates coil center 62 in) space $S_{10}$ in FIG. 1, implying that the current induced by a coil driven system from a counterclockwise current in coil 12 will be in the same direction for each wire (the code "1" is used to signify current flowing into the start of a serpentine conductor 43–50 and out from the common returns 51a and 51b; a code of "0" signifies current flowing into the common returns 51a and 51b and out from the start of a conductor 43–50. Space $S_{11}$ in FIG. 1 is identified by the binary code "11111110", as the current induced in conductor 50 would be in the opposite phase of all the others; space $S_{12}$ is identified by the binary code "11110110", as the phase of conductor 47 would be inverted compared to space $S_{11}$. Each space on the tablet similarly has a unique binary code associated with it; the number of spaces which can be designated without reporting a previously used binary number is the maximum length of the tablet, also called the "uniqueness length" and the "MAXIMAL" length. The full Gray-type code for all of spaces 58 in FIG. 1 may be obtained as described above.

The tablet length in a given axis depends upon the basic spacing "W" between adjacent conductor active portions, the number of conductors, and the repeat increments for each conductor (i.e., the number of active portions per conductor). For the X-axis grid 40 depicted in FIG. 1, for a basic conductor active portion spacing of 0.25 inch, with eight conductors and a repeat increment of from 4–10 (each conductor having from 4–10 active portions), which provide 80 conductor active portions and 79 spaces, a maximum tablet length of 19.75 inches is obtained, of which about 18 inches is the active area 42.

The binary numbers identifying the spaces or regions in the Y-axis grid (not shown) may similarly be obtained. The Y-axis grid may be identical to that for the X-axis (but rotated 90 degrees) for a square active area, or smaller or larger depending upon the particular geometry desired for the active area. As such, the Y-axis grid may have the same number as, or more or less than, the number of conductors in the X-axis grid.

As indicated above, the serpentine-type conductors may have the active portions thereof connected in series as described above, or in other ways such as in parallel. In the case of a parallel connection of active portions, operation for very low resistance conductors is generally as described above for series-connected active portions. However, as the resistance of a conductor increases, response of that conductor may change sufficiently with distance from the source of current that compensation techniques may have to be employed to, for example, provide for equal current flow in similarly situated conductor active portions.

Signal acquisition and processing to obtain the signals representing the coordinates of the movable element relative to the digitizer active area are described below. Referring to FIG. 3A, coil driven digitizer system 130 according to the invention comprises digitizer tablet 131 which includes X and Y axes grids 100 and 101 similar to X-axis grid 40 of FIG. 1, and signal acquisition and processing circuitry 132. One end of each of X-axis grid conductors 43x–50x is coupled to an X-axis multiplexer 133, and one end of each of Y-axis grid conductors 43y–50y is coupled to a Y-axis multiplexer 153. Multiplexers 133, 153 may be conventional 8-to-1 multiplexers. Respective opposite ends of X-axis grid conductors 43x–50x are connected to ground, and respective opposite ends of Y-axis grid conductors 43y–50y are connected to ground. Output 155 of multiplexer 133 and output 156 of multiplexer 153 are coupled to current sensing amplifier 148. Microprocessor 150 via X/Y select lines 152, 153 enables one of multiplexers 133, 153 at a time, and via address bus 154 selects one grid line at a time to be coupled from an input of the enabled multiplexer 133, 153 to the output 155, 156 of the enabled multiplexer 133, 153.

Microprocessor 150 is coupled to read only memory (ROM) 160 (e.g., EPROM) containing the program for operating digitizer system 130, a look-up table for correlating binary numbers corresponding to the current phases in the individual conductors of grids 100, 101 to a coarse tablet location, and a look-up table for scaling current amplitudes used for interpolation, as described above. Microprocessor 150 also includes temporary read/write memory for storing the digital signals corresponding to the induced currents detected in the individual grid conductors. Such temporary memory may simply be registers or random access memory (RAM).

Current sensing amplifier 148 is coupled to an analog-to-digital (A/D) converter 162 which is in turn coupled to microprocessor 150. Current sensing amplifier 148 may include circuitry for introducing a dc offset to the currents sensed from X/Y multiplexers 133, 153, as described below.

As mentioned above, digitizer system 130 is coil driven, i.e., coil 12 is energized and the signals induced in grid conductors 43x–50x and 43y–50y are sampled and processed to obtain the coordinates of coil 12 relative to the active area 172 of tablet 131. Coil 12 is tuned to the frequency of interest and induces a current in each of grid conductors 43x–50x and 43y–50y depending on the position of coil 12. Microprocessor 150 outputs clock pulses at a given frequency, e.g., 10 KHz. to 20 KHz., to driver 176, which provides sufficient current to coil 12. Microprocessor 150 is programmed in known manner to associate currents sampled on the grid conductors with phasing of the signals supplied to coil 12.

FIG. 3B shows a digitizer system 130B which is grid driven, i.e., conductors 43x–50x and 43y–50y are sequentially energized, and the currents induced in coil 12 are sampled. Multiplexers 133 and 153 sequentially switch one end of each of the grid conductors to ground while an energizing signal is applied from driver 176b to the other ends which are connected together and to driver 176b. Current sensing amplifier 148b, which is coupled to coil 12, senses and amplifies signals induced in coil 12 generally as described above for signals induced in the grid conductors of system 130. A/D converter 162B converts the analog signals to digital signals which are supplied to microprocessor 150. Signal acquisition and processing is generally as described above for coil driven system 130 of FIG. 3A, with changes that are apparent due to the dual nature of coil and grid driven systems.

Processing circuitry 132, 132b is shown functionally in FIGS. 3A and 3B, and may be implemented by discrete components, or by a microcontroller or microcomputer including all or some of the functional blocks depicted. For example, an 8096-family microcontroller, available from Intel Corp., with associated support circuitry may implement microprocessor 150, A/D converter 162, 162B, ROM 160 and driver 176, 176b depending upon the particular microcontroller selected. If sufficient input/output pins are available, microprocessor 150 may also implement multiplexers 133, 153. Current sensing amplifier 148, 148b may be implemented by conventional operational amplifier circuitry. If not implemented by microprocessor 150, ROM 160 may be implemented by conventional EPROM chips, etc. Strobe signal lines, a clock and other conventional components or parts of processing circuitry 132, 132b have not been shown and are known to those of skill in the art.

Figure 4:
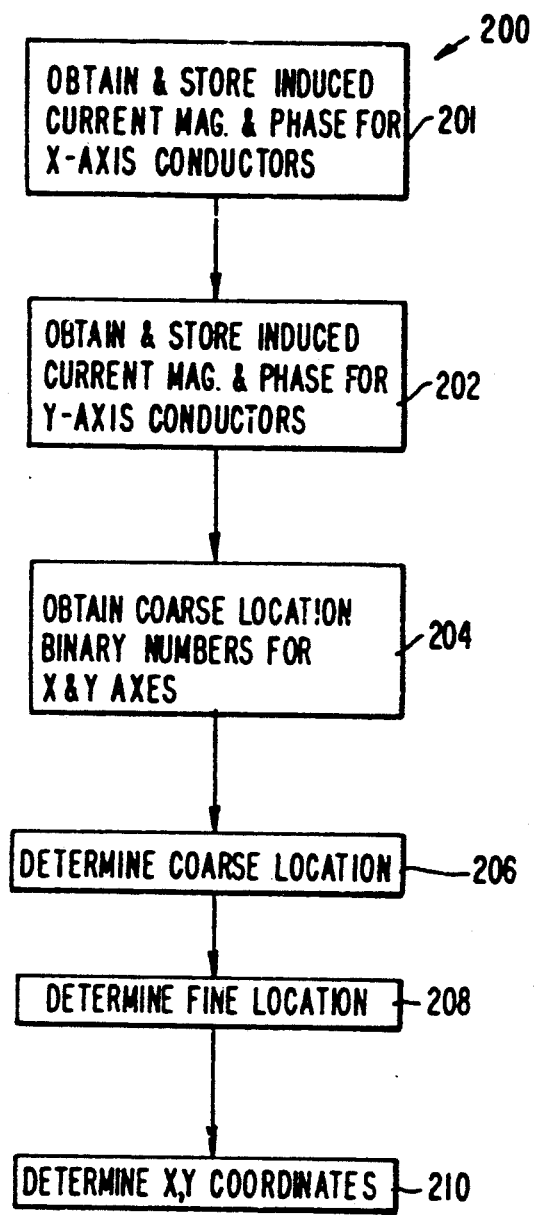
FIG. 4 is a flow chart illustrating operation of the grid structure and signal processing circuitry of FIG. 3A.

Referring next to the flow chart in FIG. 4, digitizer system 130 (FIG. 3A) is operated according to a main routine 200 as follows. The magnitudes and phases of the current signals induced in each of the eight conductors of the X-axis grid conductors 43x-50x and the Y-axis grid conductors 43y-50y for the position of coil 12 on active area 172 are obtained and temporarily stored in internal registers of microprocessor 150 according to routines 201 and 202. For the cursor-driven system 130 of FIG. 3A, each grid conductor 43x-50x and 43y-50y is sequentially coupled to current sensing amplifier 148, which interjects a dc offset to the sensed current signals and amplifies the sensed current signals, providing voltage output signals proportional to the amplified current signals. For example, the voltage output signals may have a dc offset of 2.0 volts, so that voltages between 0 and 2.0 are 180 degrees out of phase with voltages above 2.0 volts. These voltage signals are supplied to A/D converter 162 which converts the positive analog voltages to digital signals and supplies them to microprocessor 150 which causes the digital representations of the analog voltages to be stored in internal registers. Microprocessor 150 is programed to recognize stored voltages below 2.0 volts as corresponding to rid currents of one phase, and to recognize stored voltages above 2.0 volts as corresponding to currents of the opposite phase.

The binary number described above which represents the coarse location of the center of coil 12 within a particular space or regions between two immediately adjacent conductor active portions for the X axis and for the Y axis is then determined by microprocessor 150 according to routine 204. Microprocessor 150 accomplishes that by ordering the phases of the stored voltage signals in accordance with the multiplexing sequence of the grid conductors for each axis.

The binary numbers obtained in routine 204 are indexed by microprocessor 150 according to routine 206 in a look-up table contained in ROM 160, which supplies the coordinates of the coarse location, i.e., the particular region between conductor active portions for each axis in which the center of coil 12 lies. If mathematical interpolation is used to determine fine location (routine 208), the indexed location of the ROM look-up table also identifies the conductors which are to be used in the fine location determination for each axis.

However, fine location may be determined largely independently of the coarse position determination, i.e., a number of techniques may be used for fine position determination, and microprocessor 150 determines fine position according to routine 208. For example, fine location may be determined as disclosed in Ser. No. 07/505,944 and in other ways.

Referring again to FIG. 4, microprocessor 150 in routine 210 then determines the precise X and Y coordinates of the cursor from the coarse and fine location determinations for each axis.

As indicated above, the particular grid conductor patterns which satisfy the minimum and maximum repeat increments, and which are capable of identifying the spaces between conductor active portions in a Gray-type binary code may be determined manually or with computer assistance. For example, the algorithm disclosed in Ser. No. 07/505,944 may be used with the added constraint that the maximum change in repeat increment between consecutive runs of a conductor be set to zero. However, using the algorithm of Ser. No. 07/505,944 with that constraint is not very efficient in determining a relatively large number of possible patterns that satisfy the algorithm because the likelihood of quickly finding a successful pattern substantially decreases with each successful pattern.

Therefore, it is preferred that successful patterns be determined in accordance with the following considerations and algorithm. With a uniform repeat increment, or equal spans (for simplicity span will be used in the following description for repeat increment) for each conductor or wire (wire will be used in the following description for simplicity), the positioning of a wire's active portions on the gird is predetermined by the wire's starting location or position and the span or repeat increment (e.g. with the wire starting at the #3 active portion location, i.e., the third active conductor portion in the grid pattern, and a span of 5, the wire is defined as having active portions located at locations 3, 8, 13, 18, . . . ). A sequence of n wires (n being an integer greater than or equal to three) with fixed spans is defined as having infinite length if no two wires are defined to be located at the same location.

Figure 5:
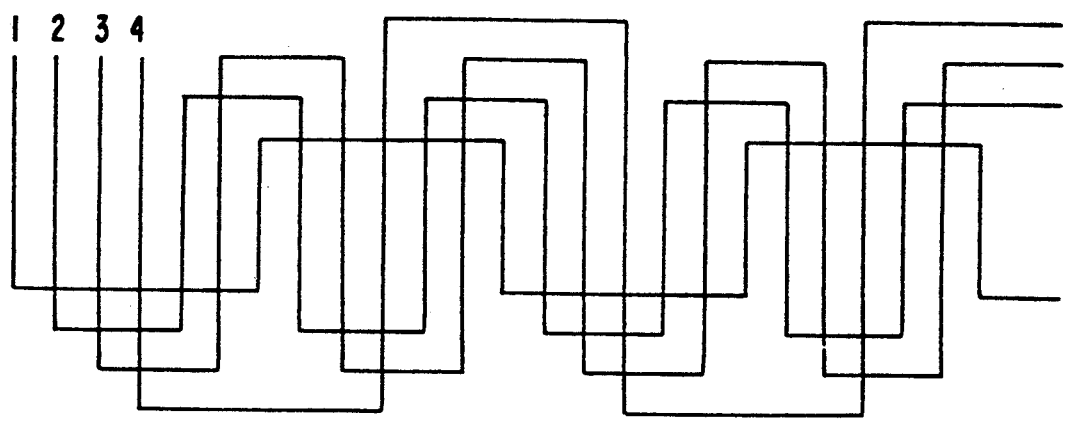
FIGS. 5 and 6 show two examples of infinite length sequences of four serpentine-type conductors or wires according to the invention.
Figure 6:
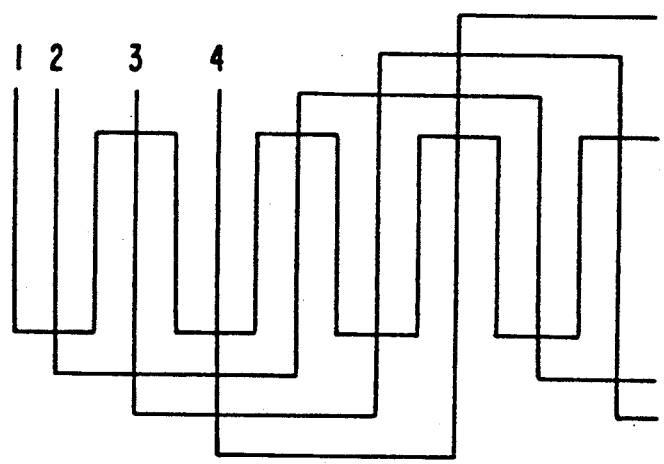

One example of an infinite length sequence of four wires, defined as a 6-3-3-6 sequence, is shown in FIG. 5. The spans of the four wires in that sequence are 6,3,3,6, respectively (the start position is self-imposed as the next unavailable position not occupied by the active portion of a prior wire). Another four wire infinite sequence, a 2-6-6-6 sequence, is shown in FIG. 6. In that sequence, the start locations of four wires are imposed to be 1,2,4,6, respectively, since once the first wire is defined to have a span of two, positions or locations 1,3,5, . . . are no longer available to start subsequent wires (so wire #3 can not start at location 3 and instead starts at location 4).

Any sequence Which is not of infinite length will have a maximum length equal to (span (i)) x (span (j)), where i & j are the two wires which become coincident at some location (if no two wires become coincident, the sequence is an infinite sequence). Any Gray code sequence is an infinite sequence, since by definition in a Gray code, no two bits (active wire portions) of the code change at the same time (location). A four wire grid laid out according to a conventional Gray Code has a 2-4-8-8 span sequence.

Although there are a number of infinite length sequences for a given number of wires, not all these sequences are suitable for consideration as grid designs, as their minimum and maximum spans may not be suitable for determining location; i.e. the maximum span may be too large for an unambiguous determination of the phase of the signal, or the minimum span may not provide for a signal of suitable characteristics for fine location determination, or the characteristics of each line may be significantly different from other lines, requiring some compensation in their processing or design (e.g. a wire with a span of 2 will be significantly longer (have more resistance and capacitance) than one with a span of 16 in the same design (since the span-2 wire will traverse back and forth across the gird eight times as often as the span-16 wire).

As mentioned above, the large difference in wire resistance between wires and the need to unambiguously determine the phase of a wire active portion as much as eight inches from the coil center are two reasons that grids laid out according to a conventional Gray code are unacceptable beyond five or six-wire size tablets, which at ¼ inch wire spacing are tablets of approximately 8–16 inches (32–64 regions). A six wire grid laid out according to a conventional Gray code would have a span sequence of 2-4-8-16-32-32, with the first wire having 16 times the resistance and capacitance of the sixth wire. The electronics for such a grid would have to be designed to unambiguously determine the phase of the active portion of the sixth wire from as much as 8 inches away.

The advantage of the conventional Gray (maximal sequence length) code approach for grid layout is that it provides for a unique code for $2^n$ regions Constraining the grid wires to have a minimum or maximum span, or both, will result in fewer uniquely identifiable regions; the reduction will be a function of the number of wires and the amount by which the constraints differ from the unconstrained spans of a Gary code grid pattern. In the limiting case, if minimum span=maximum span=the number of wires "n", only 2n regions would be uniquely identifiable.

A span sequence which produces a maximal length grid can be defined, therefore, as an infinite length sequence of n wires, with the span of each wire less than or equal to the maximum specified span and greater than or equal to the minimum specified span, which produces at least as many, or more, unique regions than any other infinite length sequence with the same span constraints. This sequence will be termed the "maximal length span sequence" or "MAXLENGTH".

The algorithm for determining MAXLENGTH for n wires, n being an integer greater than or equal to three, with a minimum span of "MINSPAN", and a maximum span of "MAXSPAN" is as follows.

(a) find an infinite length span sequence for the n wires;

(b) determine the number of unique regions defined for the infinite length sequence;

(c) remember that sequence;

(d) repeat step (a) to find another infinite length span sequence;

(e) repeat step (b) for the other infinite length span sequence;

(f) remember the other infinite length span sequence if the number of unique regions is greater than found previously;

(g) repeat steps (d), (e) and (f) until no sequence has more unique regions than the remembered sequence; and (h) report the largest remembered sequence as the MAXLENGTH.

Using this maximal length span sequence, the grid pattern may be laid out. If the length of the grid (plus any margin area) can not be spanned by this maximal length span sequence, one or more of the design constraints (n, MINSPAN, MAXSPAN) has to be changed. Similarly, if the maximal length ("MAXIMAL") of a particular maximal length span sequence is significantly greater than the required length, the algorithm may be repeated with tighter constraints (fewer n, less difference between MINSPAN and MAXSPAN, etc.) to potentially reduce costs or improve performance.

The algorithm for finding an infinite length sequence (step a above) is based on the algorithm for finding a span for a wire which does not result in placement of a wire active portion at a previously used location (i.e. at a location where the active portion of a prior wire is located). This algorithm is premised on the observation that if two wires i, j intersect at an active portion location, they must intersect at least once across a length equal to (span(i))×(span(j)); therefore, only a small portion of the infinite length need be checked to determine if the two wires will intersect. If the two wires do not intersect within (span(i))×(span(j)), they will not intersect anywhere. At the point where they intersect, if they do, it is further observed that start(i)+$n_i$×(span-(i))=start(j)+$n_j$×(span(j)), where $n_i$ and $n_j$ are the number of spans from start(i) and start(j), respectively, to the point of intersection.

Since $n_i$ and $n_j$ must be integers, the above equation can be restated at the point of intersection as: [(start-(i)−start(j)+$n_i$×(span(i)) modulo span (j)]=0.

Note that $n_i$ is an independent variable, but that $n_i$×(-span(i)) defines the locations within a length of the infinite sequence which must be searched for an intersection. Since only maximum length=(span(i))×(-span(j)) need be searched, the algorithm may be stated as:

Given: start(*i*), start(*j*), span(*i*);
find span(*j*) such that for $n$ = 0 to span(*j*),
[(start(*i*) − start(*j*) + $n_i$ × (span(*i*)) modulo span (*j*)] ≠ 0
or alternatively stated as:
Given: start(*i*), start(*j*), span(*i*);
find span(*j*) such that for $n$ = 0 to span(*j*),
[$n$ × (span(*i*)) modulo span (*j*)] ≠
[(start(*i*) − start(*j*)) modulo span (*j*)]

The above is further modified by the MINSPAN and MAXSPAN criteria.

Figure 7:
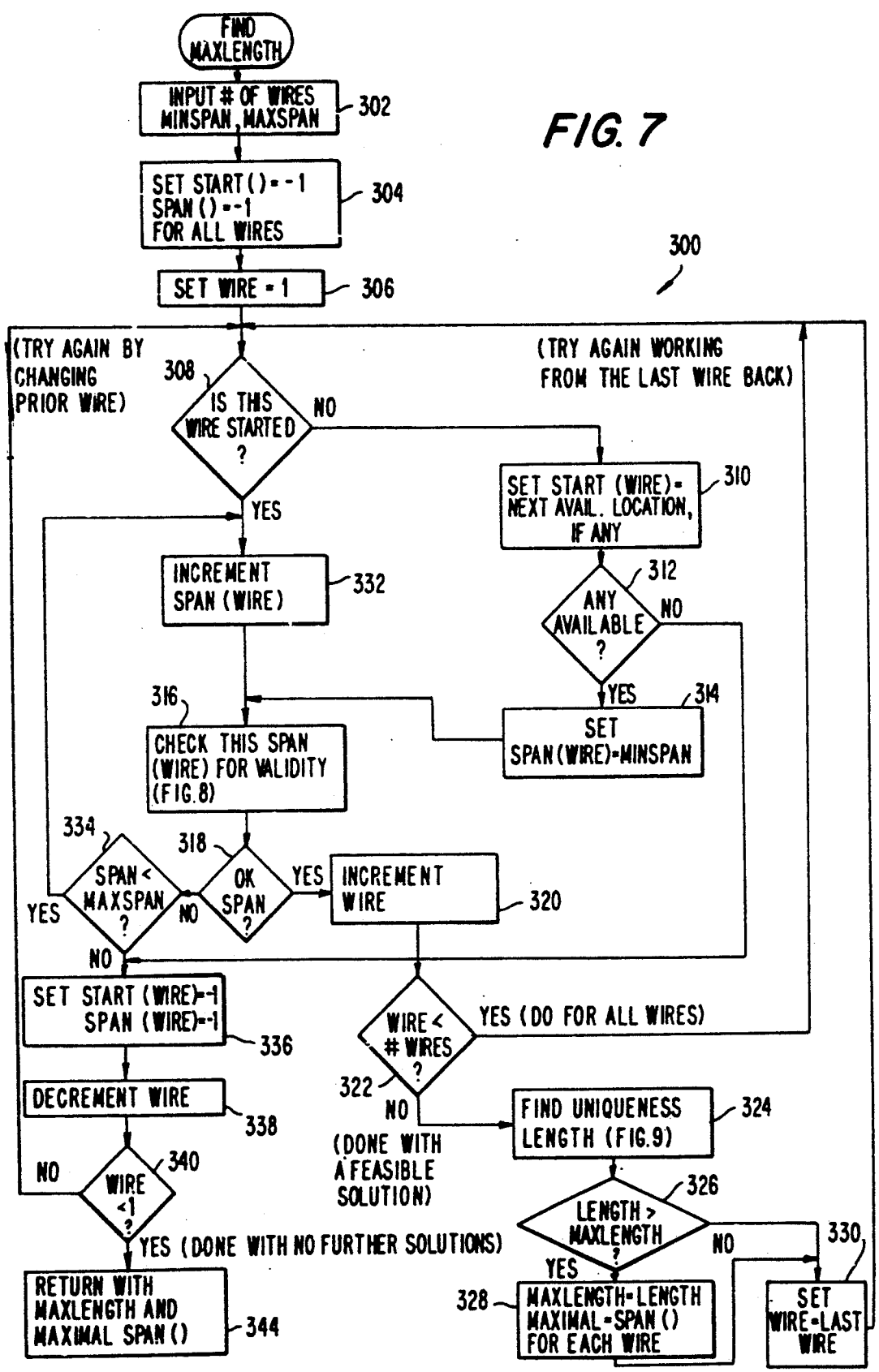
FIGS. 7-9 are flow charts illustrating selection of serpentine-type grid conductor patterns in accordance with the invention.
Figure 8:
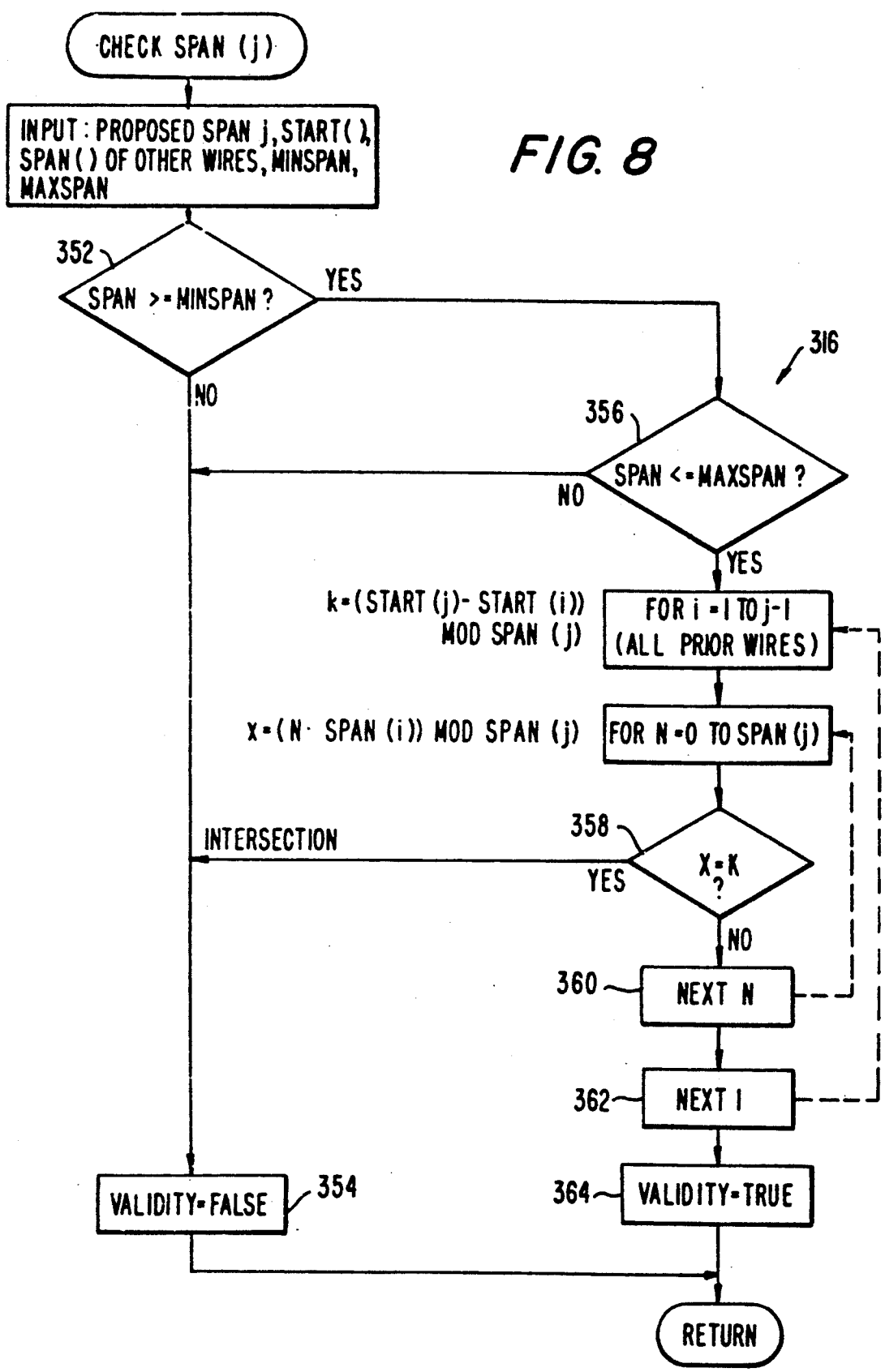
Figure 9:
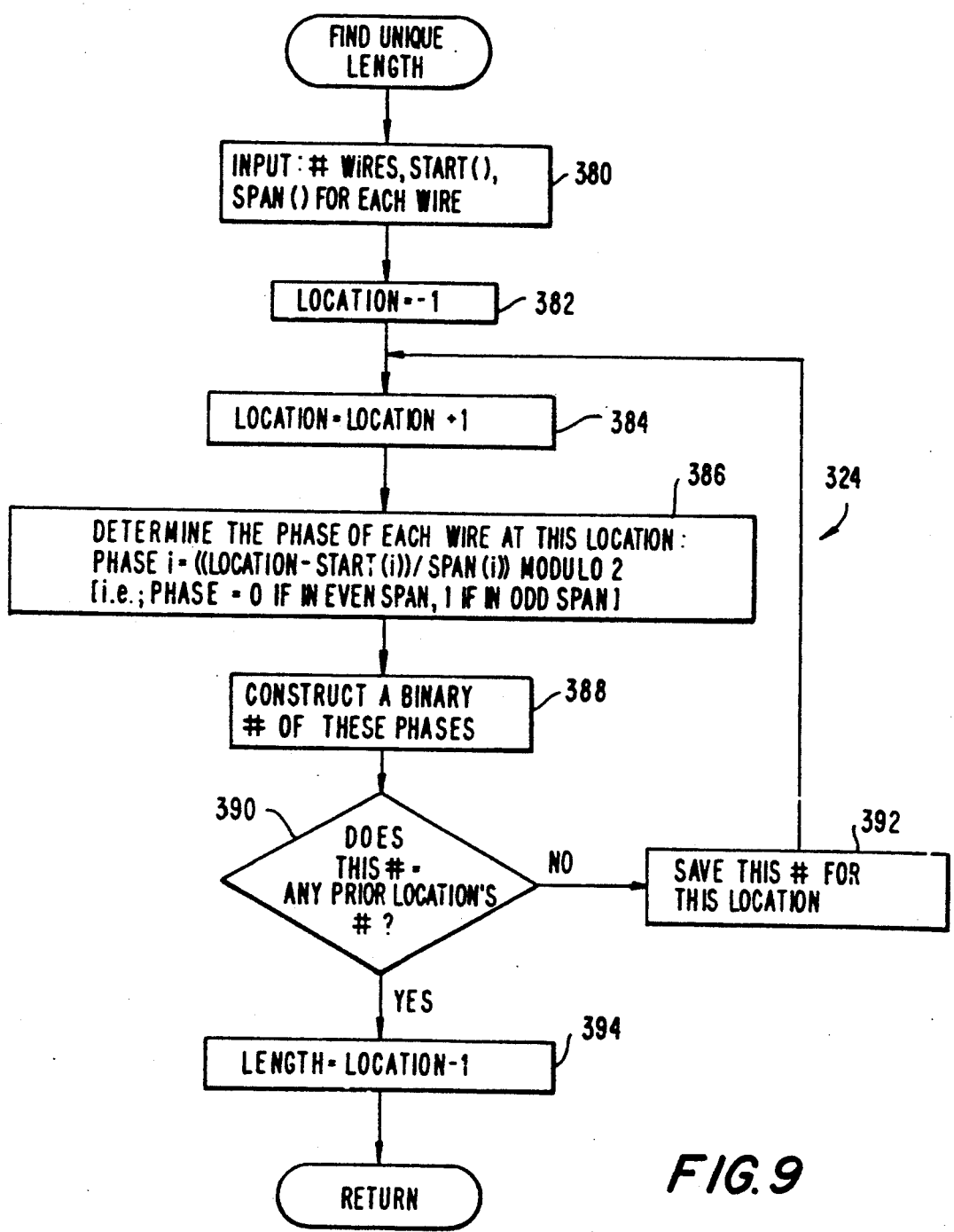

FIG. 7 is a flow chart for determining all maximal length span sequences; FIG. 8 is a flow chart for determining if a span for the jth wire is feasible, i.e., conforms to the above constraints; and FIG. 9 is a flow chart for finding the uniqueness length.

Referring to FIG. 7, the number of wires, the MAXSPAN and the MINSPAN are input into algorithm 300 in step 302 thereof. The start locations and spans are set to −1 for all wires in step 304 ("−1" indicates that a wire has not yet started). Wire #1 is selected in step 306 to start the span sequence, and in step 308 the algorithm determines whether the selected wire was already started in the sequence, i.e., previously selected, or is selected for the first time. If the selected wire was not previously started, then in step 310 the start location of the selected wire is set to the next available location. Step 312 determines whether there are any starting locations left, i.e., with the given basic spacing whether a unique starting location may be selected. If another starting location is available, the wire span is set to MINSPAN in step 314 to start the search. If the wire has already been started (yes in step 308), its span is incremented (step 332) to product a new sequence to be checked. The span of the selected wire is checked for validity in step 316, i.e., non-intersection with active portions of other wires, and if found to be valid in step 318, the wire number is incremented in step 320, i.e., the next wire is selected and, if the incremented wire is less than the number of wires (step 322), the process is repeated from step 308 until all the wires are given a start and span (step 322). FIG. 8 is a flow chart for checking the span validity (step 316).

If there are no wires left (step 322), i.e., all wires have been inserted into the pattern, the uniqueness length of the pattern is determined in step 324. FIG. 9 is a flow chart for determining the uniqueness length. Step 326 determines whether the uniqueness length exceeds the MAXLENGTH. If the uniqueness length exceeds the MAXLENGTH, then MAXLENGTH is set equal to the uniqueness length and MAXIMAL is set equal to the spans for the wires in step 328. The wire number is set to the last wire number in step 330. The algorithm then reverts to step 308 to find additional sequences working from the last wire back.

If steps 316 and 318, described above, determine the span to be invalid, the span of the wire being considered is checked in step 334 to see if it is less than the MAXSPAN. If it is, then the algorithm reverts to step 332 and the span width is incremented by the basic spacing. If the span of the wire being considered is greater than or equal to the MAXSPAN, or it was not able to be started (step 312), then that wire is withdrawn in steps 336 and 338, i.e., the start and span for that wire are set again to −1 in step 336 and the wire number is decremented in step 338 as the algorithm works back from the last wire to generate alternatives.

If the wire number is less than the first wire (step 340), then the algorithm has exhausted all alternatives, and the MAXLENGTH and MAXIMAL SPANS have been determined and are provided in step 344. If the wire number is not less than the first wire (step 340), then the algorithm reverts to step 308 continuing to work backwards from the current wire.

Referring to FIG. 8, an algorithm for step 316 of the FIG. 7 flow chart determines whether a particular wire span is valid. A valid span is one which conforms to the MINSPAN, MAXSPAN criteria, and which allows for the wire to be placed infinitely at this span without being coincident with an already placed wire. In step 350, information for the proposed span j is input, i.e., the start and the span of other wires, and MAXSPAN and MINSPAN. If in step 352 the span length is less than (not greater than or equal to) the MINSPAN, then the proposed wire span is not valid (step 354). If greater than or equal to the MINSPAN, then the span length is checked against the MAXSPAN in step 356. If the span length is greater than (not less than or equal to) the MAXSPAN, then the proposed wire span is not valid (step 354). If the span length is less than or equal to the MAXSPAN, then step 358 determines whether x=k, where k=(start (j)−start (i)) MOD SPAN for i=1 to j-1, and x=(n×span (i)) MOD SPAN for n=o to SPAN (j). If at any i or n it does, then there is an intersection and the proposed wire span is not valid (step 354), and the check is terminated. If all i and all n are checked (steps 360, 362) with no match (step 358), then a coincidence point does not exist and the choice of span (j) is deemed valid (step 364).

Referring to FIG. 9, an algorithm for step 324 of the FIG. 7 flow chart determines the uniqueness length of the wire pattern including all wires. In step 380, the number of wires, the start for the wires and the spans for the wires are input. In step 382 the location is set to −1, and in step 384 the location is incremented. In step 386 the phase of each wire active portion up to the incremented location is determined, i.e., phase =0 if an even span of the wire and phase=1 if an odd span of the wire. A binary number is constructed from the phases in step 388 as described above. If the binary number obtained in step 388 is unique, i.e., is not the same for prior locations, as determined in step 390, then the unique binary number for this location is saved in step 392 and the algorithm reverts to step 384 where the location is incremented. Steps 384, 386, 388 and 390 (and step 392 if necessary) are repeated until the location is found to be non-unique in step 390. Then in step 394 the length of the pattern is set equal to the length at the last unique location.

If the desired length is known apriori, and the minimum and maximum spans and number of wires are set by other considerations, then pattern determination may be terminated as soon as a sufficient uniqueness length (≧desired length) is determined, rather than continuing to search for the MAXLENGTH.

As is the case with most digitizer grid structures, "edge effect" errors may be present in areas close to the conductor connecting portions and the ground and returns of the conductors. Such errors ma be avoided or minimized by defining an active area suitably spaced from such connecting portions, returns and ground. Alternatively, such "edge effects" may be compensated.

Certain changes and modifications of the embodiments of the invention herein disclosed will be readily apparent to those of skill in the art. Moreover, uses of the invention other than for coordinated determination in a digitizer system will also be readily apparent to those of skill in the art. It is the applicant's intention to cover by the claims all such uses and all those changes and modifications which could be made to the embodiments of the invention herein chosen for the purposes of disclosure which do not depart from the spirit and scope of the invention.

What is claimed is:

1. A conductor structure for a position-determining device which includes a movable element and determines the location of said movable element relative to said conductor structure;

said conductor structure comprising;

at least first, second and third conductors each of which includes at least three active portions extending substantially in a first direction substantially in or adjacent a common plane substantially parallel to each other, said conductors each having repeat increments which space adjacent active portions of the same conductor;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure;

(b) said conductors each having a uniform repeat increment;

(c) said conductors each having a repeat increment different from that of some of the others of said conductors; and (d) said conductors each having a maximum repeat increment determined in relation to desired noise immunity.

2. A conductor structure for a position-determining device which includes a movable element and determines the location of said movable element relative to said conductor structure;

said conductor structure comprising;

at least first, second and third conductors each of which includes at least three active portions extending substantially in a first direction substantially in or adjacent a common plane substantially parallel to each other, said conductors each having repeat increments which space adjacent active portions of the same conductor;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure;

(b) said conductors each having a uniform repeat increment;

(c) said conductors each having a repeat increment different from that of some of the others of said conductors; and (d) said conductors each having a minimum repeat increment which is greater than twice the spacing between adjacent spaced active portions of said conductors.

3. The conductor structure of claim 2 wherein said conductors each have uniform repeat increments in a position determining area of said conductor structure.

4. A conductor structure for a position-determining device which includes a movable element and determines the location of said movable element relative to said conductor structure;

said conductor structure comprising;

at least first, second and third conductors each of which includes a plurality of active portions extending substantially in a first direction substantially in or adjacent a common plane substantially parallel to each other, said conductors each having repeat increments which space adjacent active portions of the same conductor;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) said conductors each having a uniform repeat increment;

(c) said conductors each having a repeat increment different from that of some of the others of said conductors; and (d) said conductors each having a repeat increment constrained by a maximum repeat increment that is determined in relation to desired noise immunity and a minimum repeat increment which is greater than twice the spacing between adjacent spaced active portions of said conductors.

5. Apparatus for determining the location of a movable element relative to a given area comprising:

a conductor structure which interacts with said element when said element is on or adjacent said given area and upon energization of at least one of said conductor structure and said element;

said conductor structure comprising:

at least first, second and third conductors each of which includes a plurality of active portions extending substantially in a first direction substantially in or adjacent a common plane substantially parallel to each other, said conductors each having repeat increments which space adjacent active portions of the same conductor;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) said conductors each having a uniform repeat increment;

(c) said conductors each having a repeat increment different from that of some of the others of said conductors; and (d) said conductors each having a maximum repeat increment determined in relation to desired noise immunity;

said apparatus including:

means for energizing one of said conductor structure and said movable element to cause location-determining signals to be present in the other;

means for processing said location-determining signals in the other of said conductor structure and said movable element, said processing means including first means for obtaining from said location-determining signals binary signals corresponding to said binary digits which identify said conductor runs and are indicative of the location of said movable element relative to said given area.

6. Apparatus for determining the location of a movable element relative to a given area comprising:

a conductor structure which interacts with said element when said element is on or adjacent said given area and upon energization of at least one of said conductor structure and said element;

said conductor structure comprising:

at least first, second and third conductors each of which includes a plurality of active portions extending substantially in a first direction substantially in or adjacent a common plane substantially parallel to each other, said conductors each having repeat increments which space adjacent active portions of the same conductor;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) said conductors each having a uniform repeat increment;

(c) said conductors each having a repeat increment different from that of some of the others of said conductors; and (d) said conductors each having a minimum repeat increment which is greater than twice the spacing between adjacent spaced active portions of said conductors;

said apparatus including:

means for energizing one of said conductor structure and said movable element to cause location-determining signals to be present in the other;

means for processing said location-determining signals in the other of said conductor structure and said movable element, said processing means including first means for obtaining from said location-determining signals binary signals corresponding to said binary digits which identify said conductor runs and are indicative of the location of said movable element relative to said given area.

7. Apparatus for determining the location of a movable element relative to a given area comprising:

a conductor structure which interacts with said element when said element is on or adjacent said given area and upon energization of at least one of said conductor structure and said element;

said conductor structure comprising:

at least first, second and third conductors each of which includes a plurality of active portions extending substantially in a first direction substantially in or adjacent a common plane substantially parallel to each other, said conductors each having repeat increments which space adjacent active portions of the same conductor;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) said conductors each having a uniform repeat increment;

(c) said conductors each having a repeat increment different from that of some of the others of said conductors; and (d) said conductors each having a repeat increment constrained by a maximum repeat increment that is determined in relation to desired noise immunity and a minimum repeat increment which is greater than twice the spacing between adjacent spaced active portions of said conductors.

said apparatus including:

means for energizing one of said conductor structure and said movable element to cause location-determining signals to be present in the other;

means for processing said location-determining signals in the other of said conductor structure and said movable element, said processing means including first means for obtaining from said location-determining signals binary signals corresponding to said binary digits which identify said conductor runs and are indicative of the location of said movable element relative to said given area.

8. A conductor system for a position-determining device which includes a movable element and determines the location of said movable element relative to said conductor system;

said conductor system comprising first and second conductor structures;

said first conductor structure comprising:

at least first, second and third conductors each of which includes a plurality of active portions extending substantially in a first direction substantially in or adjacent a common plane substantially parallel to each other, said conductors each having repeat increments which space adjacent active portions of the same conductor;

said second conductor structure comprising:

at least fourth, fifth and sixth conductors each of which includes a plurality of active portions extending substantially in a second direction transverse to said first direction substantially in or adjacent a common plane substantially parallel to each other, said fourth, fifth and sixth conductors each having repeat increments which space adjacent active portions of the same conductor;

said conductors of said first conductor structure and said conductors of said second conductor structure being arranged in respective patterns such that for each pattern:

(a) each of said active portions of all of said conductors or spaces therebetween of each conductor structure may be uniquely identified by a unique binary number with respect to that conductor structure, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) said conductors each having a uniform repeat increment;

(c) said conductors each having a repeat increment different from that of some of the others of said conductors; and (d) said conductors each having a repeat increment constrained by a maximum repeat increment that is determined in relation to desired noise immunity and a minimum repeat increment which is greater than the spacing between adjacent spaced active portions of said conductors.

9. Apparatus for determining the location of a movable element relative to a given area comprising:

a conductor system which interacts with said movable element when said movable element is on or adjacent said given area and upon energization of at least one of said conductor system and said movable element;

said conductor system comprising first and second conductor structures;

said first conductor structure comprising:

at least first, second and third conductors each of which includes a plurality of active portions extending substantially in a first direction substantially in or adjacent a common plane substantially parallel to each other, said conductors each having repeat increments which space adjacent active portions of the same conductor;

said second conductor structure comprising:

at least fourth, fifth and sixth conductors each of which includes a plurality of active portions extending substantially in a second direction transverse to said first direction substantially in or adjacent a common plane substantially parallel to each other, said fourth, fifth and sixth conductors each having repeat increments which space adjacent active portions of the same conductor;

said conductors of said first conductor structure and said conductors of said second conductor structure being arranged in respective patterns such that for each pattern:

(a) each of said active portions or spaces therebetween of all of said conductors of each conductor structure may be uniquely identified by a unique binary number with respect to that conductor structure, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) said conductors each having a uniform repeat increment;

(c) said conductors each having a repeat increment different from that of some of the others of said conductors; and (d) said conductors each having a repeat increment constrained by a maximum repeat increment that is determined in relation to desired noise immunity and a minimum repeat increment which is greater than the spacing between adjacent spaced active portions of said conductors.

said apparatus including:

means for energizing one of said conductor system and said movable element to cause location-determining signals to be present in the other;

means for processing said location-determining signals in the other of said conductor system and said movable element, said processing means including first means for obtaining from said location-determining signals binary signals corresponding to said binary digits which identify said conductor active portions and are indicative of the location of said movable element relative to said given area.

10. A conductor structure for a position-determining device which includes a movable element and determines the location of said movable element relative to said conductor structure;

said conductor structure comprising;

at least first, second and third conductors each of which include a plurality of active portions extending substantially in a first direction substantially in or adjacent a common plane substantially parallel to each other, adjacent active portions of the same conductor being separated by first spaces and adjacent active portions of all of said conductors being separated by second spaces;

said conductor structure having an extent in a second direction that is different from said first direction;

said conductors being arranged in a pattern such that:

(a) said conductors each having uniform first spaces between adjacent active portions thereof and of at least one of said conductors are different;

(b) said conductors each having first spaces different from those of the others of said conductors (c) the maximum first space between any two adjacent active portions of the same conductor is less than one-half of said extent of said conductor structure; and (d) each of said second spaces between adjacent active portions or said active portions of all of said conductors may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure.

11. The conductor structure of claim 10 wherein each of said conductors has a first end and a second end, the first ends of said conductors being uniquely addressable and the second ends of said conductors being coupled together.

12. The conductor structure of claim 11 wherein said first and second directions are perpendicular to each other.

13. The conductor structure of claim 10 wherein two or more of said second spaces between adjacent conductor active portions of all conductors are equal.

14. The conductor structure of claim 10 wherein two adjacent active portions of the same conductor are separated by at least one active portion of another conductor.

15. Apparatus for determining the location of a movable element relative to a given area comprising:

a conductor structure which interacts with said element when said element is on or adjacent said given area and upon energization of at least one of said conductor structure and said element;

said conductor structure comprising:

at least first, second and third conductors each of which include a plurality of active portions extending substantially in a first direction substantially in or adjacent a common plane substantially parallel to each other, adjacent active portions of the same conductor being separated by first spaces and adjacent active portions of all of said conductors being separated by second spaces;

said conductor structure having an extent in a second direction that is different from said first direction;

said conductors being arranged in a pattern such that:

(a) said conductors each having uniform first spaces between adjacent active portions thereof;

(b) said conductors each having first spaces different from those of the others of said conductors (c) the maximum first space between any two adjacent active portions of the same conductor is less than one-half of said extent of said conductor structure; and (d) each of said second spaces between adjacent active portions or said active portions of all of said conductors may be uniquely identified by a unique binary number, respective binary digits of each of said unique binary numbers corresponding to respective conductors;

said apparatus including:

means for energizing one of said conductor structure and said movable element to cause location-determining signals to be present in the other;

means for processing said location-determining signals in the other of said conductor structure and said movable element, said processing means including first means for obtaining from said location-determining signals binary signals corresponding to said binary digits which identify said second spaces and are indicative of the location of said movable element relative to said given area.

16. The apparatus of claim 15 wherein said first and second directions are perpendicular to each other.

17. The apparatus of claim 15 wherein two or m re of said second spaces between adjacent conductor active portions of all conductors are equal.

18. The apparatus of claim 15 wherein two adjacent active portions of the same conductor are separated by at least one active portion of another conductor.

19. The apparatus of claim 15 wherein said processing means includes means for storing sets of binary numbers corresponding to locations of said element relative to said given area, and means for comparing said stored sets of binary numbers and said binary numbers obtained from said binary signals to determine said location of said element relative to said given area.

20. The apparatus according to claim 15 wherein said first means of said processing means determines a coarse location of said movable element from said binary numbers relative to said given area, said coarse location corresponding to a location of said movable element between two conductor active portions, said processing means including second means for determining a fine location of said movable element relative to said given area corresponding to a location between said two conductor active portions or on one of them.

21. The apparatus according to claim 20 wherein said processing means provides the amplitudes of said position-determining signals, and said second means performs a mathematical interpolation from selected amplitudes of selected position-determining signals.

22. The apparatus according to claim 20 wherein said conductor structure comprises two additional conductors each having a plurality of active portions extending substantially in said first direction substantially in or adjacent said common plane substantially parallel to each other, said active portions of said two additional conductors being equally spaced with respect to adjacent active portions of both of said two conductors and equally spaced with respect to active portions of the same conductor, said second means processing position-determining signals in said two additional conductors to determine said fine location, 23. A conductor system for a position-determining device which includes a movable element and determines the location of said movable element relative to said conductor system;

said conductor system comprising first and second conductor structures;

said first conductor structure comprising:

at least first, second and third conductors each of which include a plurality of active portions extending substantially in a first direction substantially in or adjacent a common plane substantially parallel to each other, adjacent active portions of the same conductor being separated by first spaces and adjacent active portions of all of said conductors being separated by second spaces;

said first conductor structure having an extent in a second direction that is different from said first direction;

said second conductor structure comprising:

at least fourth, fifth and sixth conductors each of which include a plurality of active portions extending substantially in said second direction substantially in or adjacent a common plane substantially parallel to each other, adjacent active portions of the same conductor being separated by first spaces and adjacent active portions of all of said conductors being separated by second spaces;

said second conductor structure having an extent in said first direction;

said conductors of said first conductor structure and said conductors of said second conductor structure being arranged in respective patterns such that for each pattern:

(a) said conductors each having uniform first spaces between adjacent active portions thereof;

(b) said conductors each having first spaces different from those of the others of said conductors (c) the maximum first space between any two adjacent active portions of the same conductor is less than one-half of said extent of said conductor structure; and (d) each of said second spaces between adjacent active portions or said active portions of all of said conductors may be uniquely identified by a unique binary number, respective binary digits of each of said unique binary numbers corresponding to respective conductors.

24. The conductor system of claim 23 wherein said first and second directions are perpendicular to each other.

25. The conductor system of claim 23 wherein, for each of said first and second conductor structures, said second spaces between adjacent conductor active portions of all conductors of the respective conductor structure are equal.

26. The conductor system of claim 23 wherein, for each of said first and second conductor structures, two adjacent active portions of the same conductor are separated by at least one active portion of another conductor.

27. The conductor system of claim 23 wherein said processing means includes means for storing sets of binary numbers corresponding to locations of said element relative to said conductor system, and means for comparing said stored sets of binary numbers and said binary numbers obtained from said binary signals to determine said location of said movable element relative to said conductor system.

28. The conductor system of claim 23 wherein said first means of said processing means determines a coarse location of said movable element from said binary numbers, said coarse location corresponding to a location of said movable element, with respect to each of said conductor structures, between two conductor active portions, said processing means including second means for determining a fine location of said movable element, with respect to each of said conductor structures, between said two conductor active portions or on one of them.

29. The conductor system of claim 28 wherein, for each of said conductor structures, said processing means provides the amplitudes of said position-determining signals, and said second means performs a mathematical interpolation from selected amplitudes of selected position-determining signals.

30. The conductor system of claim 29 wherein said first and second conductor structures each comprises two additional conductors which each have a plurality of active portions extending substantially in said first or second direction, respectively, substantially in or adjacent said common plane substantially parallel to each other, said active portions of said two additional conductors being equally spaced with respect to adjacent active portions of both of said two conductors and equally spaced with respect to active portions of the same conductor, said second means processing position-determining signals in said two additional conductors for each of said first and second conductor structures to determine said fine location.

31. Apparatus for determining the location of a movable element relative to a given area comprising:
a conductor system which interacts with said movable element when said movable element is on or adjacent said given area and upon energization of at least one of said conductor system and said movable element;
said conductor system comprising first and second conductor structures;
said first conductor structure comprising:
at least first, second and third conductors each of which include a plurality of active portions extending substantially in a first direction substantially in or adjacent a common plane substantially parallel to each other, adjacent active portions of the same conductor being separated by first spaces and adjacent active portions of all of said conductors being separated by second spaces;
said first conductor structure having an extent in a second direction that is different from said first direction;
said second conductor structure comprising:
at least fourth, fifth and sixth conductors each of which include a plurality of active portions extending substantially in said second direction substantially in or adjacent a common plane substantially parallel to each other, adjacent active portions of the same conductor being separated by first spaces and adjacent active portions of all of said conductors being separated by second spaces;
said second conductor structure having an extent in said first direction;
said conductors of said first conductor structure and said conductors of said second conductor structure being arranged in respective patterns such that for each pattern:
(a) said conductors each having uniform first spaces between adjacent active portions thereof;
(b) said conductors each having first spaces different from those of the others of said conductors
(c) the maximum first space between any two adjacent active portions of the same conductor is less than one-half of said extent of said conductor structure; and
(d) each of said second spaces between adjacent active portions or said active portions of all of said conductors may be uniquely identified by a unique binary number, respective binary digits of each of said unique binary numbers corresponding to respective conductors;
said apparatus including:
means for energizing one of said conductor system and said movable element to cause location-determining signals to be present in the other;
means for processing said location-determining signals in the other of said conductor system and said movable element, said processing means including first means for obtaining from said location-determining signals binary signals corresponding to said binary digits which identify said second spaces and are indicative of the location of said movable element relative to said given area.

32. The apparatus of claim 31 wherein, for each of said first and second conductor structures, said second spaces between adjacent conductor active portions of all conductors of the respective conductor structure are equal.

33. The apparatus of claim 32 wherein, for each of said first and second conductor structures, two adjacent active portions of the same conductor are separated by at least one active portion of another conductor.

34. The apparatus of claim 31 wherein said processing means includes means for storing sets of binary numbers corresponding to locations of said movable element relative to said given area, and means for comparing said stored sets of binary numbers and said binary numbers obtained from said binary signals to determine said location of said movable element relative to said given area.

35. The apparatus of claim 31 wherein said first means of said processing means determines a coarse location of said movable element from said binary numbers, said coarse location corresponding to a location of said movable element, with respect to each of said conductor structures, between two conductor active portions, said processing means including second means for determining a fine location of said movable element, with respect to each of said conductor structures, between said two conductor active portions or on one of them.

36. The apparatus of claim 31 wherein, for each of said conductor structures, said processing means provides the amplitudes of said position-determining signals, and said second means performs a mathematical interpolation from selected amplitudes of selected position-determining signals.

37. The apparatus of claim 31 wherein said first and second conductor structures each comprises two additional conductors which each have a plurality of active portions extending substantially in said first or second direction, respectively, substantially in or adjacent said common plane substantially parallel to each other, said active portions of said two additional conductors being equally spaced with respect to adjacent active portions of both of said two conductors and equally spaced with respect to active portions of the same conductor, said second means processing position-determining signals in said two additional conductors for each of said first and second conductor structures to determine said fine location.

38. A method for determining the location of a movable element relative to a conductor structure which interacts with said movable element when said movable element is adjacent said conductor structure upon energization of at least one of said conductor structure and said movable element; said conductor structure comprising at least first, second and third conductors each of which including at least three active portions extending substantially in a first direction substantially in or adjacent a common plane substantially parallel to each other, said conductors each having repeat increments which space adjacent active portions of the same conductor;

said conductors being arranged in a pattern such that:
(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and
(b) said conductors each having a uniform repeat increment;
(c) said conductors each having a repeat increment different from that of the others of said conductors; and
(d) said conductors each having a maximum repeat increment determined in relation to desired noise immunity;

said method comprising the steps of:
energizing one of said conductor structure and said movable element; and
processing signals obtained from the other of said conductor structure and movable element to provide a unique binary number which uniquely identifies a space or conductor active portion close to said movable element.

39. A method for determining the maximal length span sequence for n conductors of a conductor structure for a position-determining device which determines the position of a movable element relative to the conductor structure, when n is an integer greater than 3 and the sequence has a minimum span and a maximum span, the conductor structure having the following characteristics: each of said n conductors having a plurality of active portions extending substantially in a first direction substantially in or adjacent a common plane substantially parallel to each other, the conductors each having repeat increments which space adjacent active portions of the same conductor:

the conductors being arranged in a pattern such that;
(1) each of the active portions of all of the conductors or spaces therebetween may be uniquely identified by a unique binary number, respective binary digits of each of the unique binary numbers corresponding to respective conductors, whereby upon interaction between the movable element and respective conductors binary logic signals may be obtained corresponding to the binary digits which are indicative of the location of the movable element relative to the conductor structure:
(2) the conductors each having a uniform repeat increment; and
(3) the conductors each having a repeat increment different from that of some of the others of the conductors;

said method comprising:
(a) finding an infinite length sequence for said n wires;
(b) determining the number of unique regions defined for said infinite length sequence;
(c) remembering said sequence;
(d) repeating step (a) to find another infinite length span sequence;
(e) repeating step (b) for said another infinite length span sequence;
(f) remembering said another infinite length span sequence if the number of unique regions is greater than found previously;
(g) repeating steps (d), (e) and (f) until no sequence has more unique regions than the previous sequences; and
(h) reporting the largest remembered sequence as said maximal length span sequence.

* * * * *